United States Patent [19]
Scheurenbrand et al.

[11] Patent Number: 5,458,373
[45] Date of Patent: Oct. 17, 1995

[54] FUEL TANK ASSEMBLY

[75] Inventors: Dieter Scheurenbrand, Wolfschlugen; Manfred Weil, Schorndorf, both of Germany; Franz Gollner, deceased, late of Allerheiligen, Austria, by Manfred Gollner; Peter Weymann, Stuttgart; Hermann Horrer, Herrenberg, both of Germany

[73] Assignee: Mercedes-Benz AG, Germany

[21] Appl. No.: 167,707

[22] Filed: Dec. 16, 1993

[30]     Foreign Application Priority Data

Dec. 16, 1992 [DE] Germany ............... 42 42 497.6

[51] Int. Cl.⁶ .................................................. B60P 3/22
[52] U.S. Cl. ............................................................ 280/834
[58] Field of Search ................................. 280/834, 835, 280/833, 831, 7, 830

[56]              References Cited
         FOREIGN PATENT DOCUMENTS

| 2440905 | 3/1976 | Germany ............... 280/834 |
| 3312819 | 10/1984 | Germany ............... 280/834 |
| 3941019 | 6/1990 | Germany . |
| 3915185 | 10/1990 | Germany . |
| 4201708 | 7/1993 | Germany ............... 280/830 |
| 353023 | 12/1992 | Japan ............... 280/834 |
| 619370 | 8/1978 | U.S.S.R. ............... 280/834 |

Primary Examiner—Kevin T. Hurley
Attorney, Agent, or Firm—Evenson, McKeown, Edwards & Lenahan

[57]              ABSTRACT

The invention relates to a fuel tank having two tank parts which are connected to each other. Allocated to one tank part is an accumulation vessel and to the other tank part is a fuel distributor which is connected to a fuel return line. Two feed lines which convey fuel into the accumulation vessel are connected to the distributor. Integrated into one feed line is an ejector which is provided in the bottom region of the tank space having the distributor. Interposed in the other feed line is an ejector which is provided in the tank part having the accumulation vessel. For the purpose of being able to connect the feed lines to the fuel distributor and accumulation vessel quickly and easily, the fuel tank has a respective tank opening which can be tightly closed by them. The flexibly constructed feed lines are to be installed in the tank with an excess length which makes it possible to pull their line end pieces out of the tank openings and, outside the fuel tank, to connect them to the accumulation vessel and the distributor respectively.

17 Claims, 2 Drawing Sheets

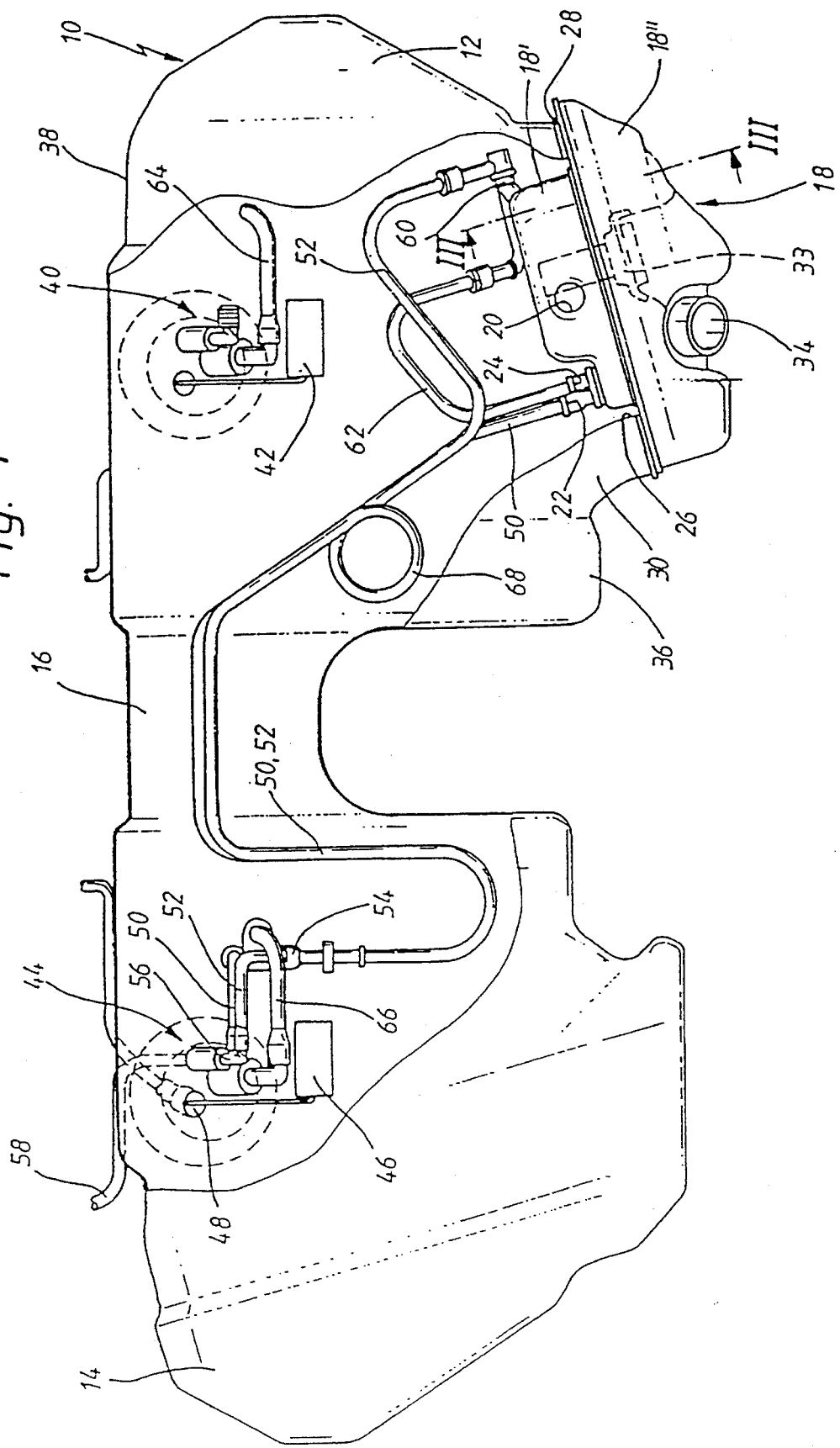

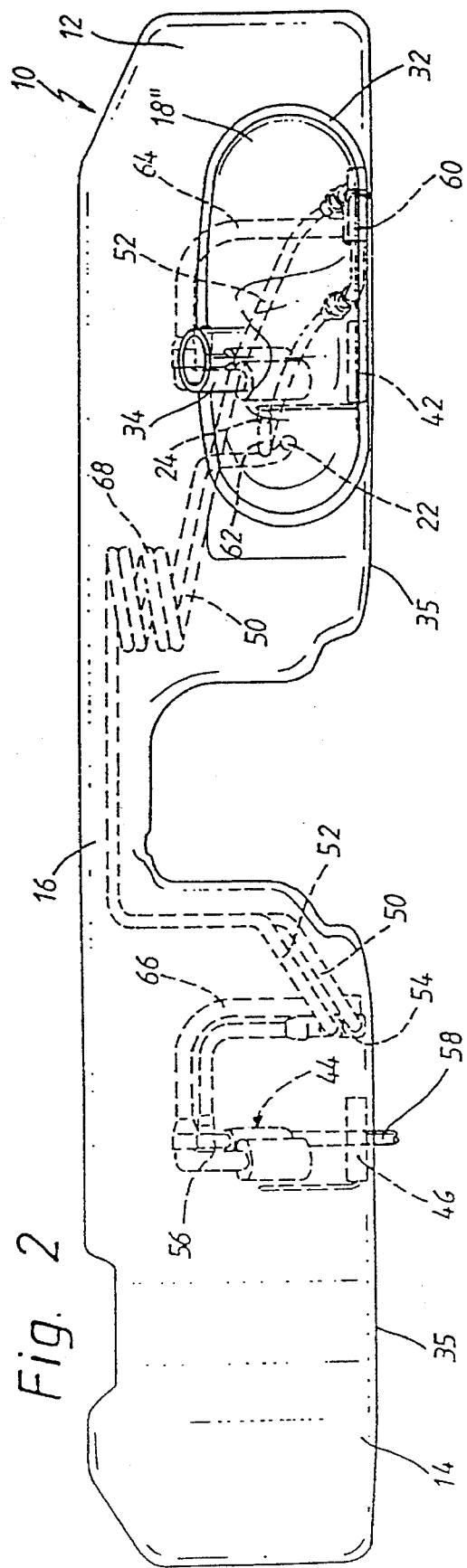
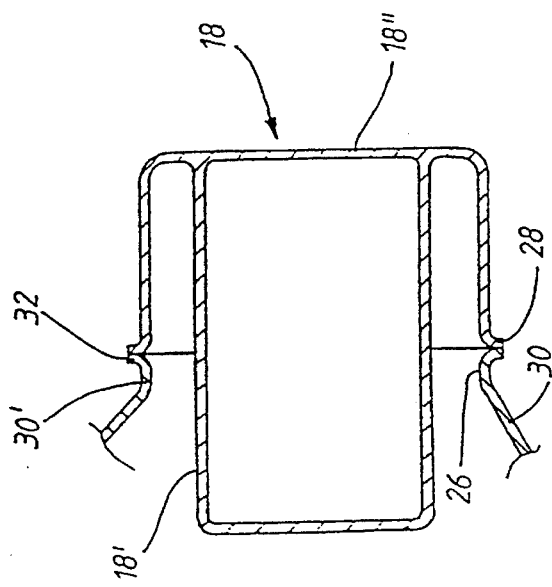

5,458,373

FUEL TANK ASSEMBLY

BACKGROUND AND SUMMARY OF THE INVENTION

The invention relates to a fuel tank assembly of a design generally known from German Patent Document DE 39 15 185 C1—FIG. 1.

In this prior arrangement, an accumulation vessel and distributor are accommodated in the interior of the fuel tank in a manner such that they are inaccessible from the outside. It is therefore necessary to secure the feed lines, which are provided for supplying the accumulation vessel with fuel, connect said vessel to the distributor, which is connected to a fuel return line, and in each case operate an ejector for emptying the tank spaces, within the fuel tank and to connect them to the distributor and accumulation vessel, for which purpose corresponding openings are to be provided on the tank body.

An object of the invention is to improve a design for a fuel tank of the type referred to above, which makes it possible to introduce and connect the feed lines in a problem-free manner.

This object is achieved according to the invention by providing an arrangement wherein the tank has respective openings for accommodating insertion of the distribution and accumulation vessel which then tightly close the respective openings in the assembled condition of the tank assembly and wherein the feed lines are flexibly formed and provided with an excess length so they can be pulled by line end pieces out of the tank openings to be connected to at least one of the accumulation vessel and distributor, respectively, prior to insertion and assembly of the accumulation vessel and distributor at the tank.

The fuel tanks to be made according to the invention are accordingly to be made, without accumulation vessel and distributor, of sheet metal or plastic with tank openings provided for the installation of the latter. Said openings make it possible to subsequently introduce the feed lines into the fuel tank. Due to the excess length, provided according to the invention, of the flexible feed lines which are located entirely in the interior of the tank, their line end pieces can then once more be pulled out of the tank openings for the accumulation vessel and distributor and connected to their connections.

The accumulation vessel and distributor are then to be inserted into the tank openings and are to be fastened in a sealing manner to the outside of the fuel tank. By this means, corresponding connecting work in the interior of the tank is rendered superfluous.

In order that the end pieces of the feed lines for connection to the accumulation vessel and distributor can be pulled to the necessary extent out of the tank openings, said feed lines, for example along a longitudinal section, may be coiled or have arcuate line sections.

In this connection, it is advantageous for the feed lines which are composed of plastic to be connected to each other in sections along a surface line so that said feed lines can be installed jointly in one working step in the fuel tank.

Other objects, advantages and novel features of the present invention will become apparent from the following detailed description of the invention when considered in conjunction with the accompanying drawings.

BRIEF DESCRIPTION OF THE DRAWINGS

FIG. 1 shows a plan view of a partially cut-away fuel tank assembly, preferably blow-moulded from plastic, constructed according to a preferred embodiment of the invention;

FIG. 2 shows a front view of the fuel tank of FIG. 1; and

FIG. 3 shows a section along the line III—III of FIG. 1.

DETAILED DESCRIPTION OF THE PREFERRED EMBODIMENTS

A fuel tank 10, which is composed of, for example, thermoplastic, is made in one piece by the blow-moulding process and comprises two tank parts 12 and 14 which in each case contain a fuel chamber.

The fuel tank 10 is designed, for example, to be installed into a vehicle chassis such that it lies flat, for which purpose its two tank parts 12 and 14 to be provided in the vehicle transverse direction at a lateral distance from each other are connected to each other via a narrow hollow web 16 lying at the top.

In the installed state of the fuel tank 10, parts of the exhaust system and/or of the drive shaft, for example, may extend between the two tank parts 12 and 14.

An accumulation vessel 18 for storing fuel at the tank-side extraction point of a fuel extraction system is provided. The accumulation vessel 18 is provided, for example, on the vertical rear side of the tank part 12 and preferably closed in the interior of the tank and equipped with an overflow opening 20 and with connections 22 and 24 for feeding fuel from the two tank parts 12 and 14.

The accumulation vessel 18 is inserted into a wall opening 26 (FIG. 3), it overlapping the wall opening 26 by a vessel section 18", which is connected to its section 18' in the interior of the tank and is located on the outside of the tank, and being connected to the tank part 12 in a manner such that it is fluid-tight all the way round.

For this purpose, the vessel section 18 is preferably designed in the manner of a cover and is provided with an outwardly directed, circumferential flange 28 which is connected to the edge piece of the wall opening 26 in a suitable manner, preferably by welding.

In order to weld-on the accumulation vessel 18 in a manner which ensures the required imperviousness and is reliable, the edge region of the wall opening 26 is formed by a neck 30 which is shaped out of the tank wall and the neck edge piece 30' of which is reshaped to form an outwardly directed weld-on flange 32.

As can be seen from FIG. 2, in addition to weld-on flange 32, neck 30 has an oval circumferential shape for reasons of strength. This can also deviate therefrom in a suitable manner.

As can be seen from the drawing, there is integrally formed on the outer vessel section 18", in addition to a connection 33 for a fuel extraction line, a filler inlet 34 which ensures that when the fuel tank 10 is being filled the stabilizing vessel 18 is initially filled and subsequently, via its overflow opening 20, the fuel tank 10 or its two tank parts 12 and 14 are filled up.

Furthermore, a level sensor 40 which can be actuated by a float 42 is inserted in a sealed manner in the bottom 35 of the tank part 12, preferably adjacent to the front wall part 38. This level sensor can equally well also be combined with the accumulation vessel 18 to form a structural unit, this simplifying its arrangement.

There is furthermore preferably inserted in a sealed manner into the bottom 35 of the tank part 14 a distributor 44 which is preferably combined with a level sensor 48 which is actuated by a float 46. The distributor 44 serves to continuously supply two feed lines 50 and 52, connected thereto, with fuel, the feed line 50 serving to convey fuel out of the tank part 14 preferably directly to the accumulation vessel 18. The feed lines 50, 52 are connected, for this purpose, to the connections 22 and 24 of the accumulation vessel 18.

The conveying of the fuel out of the tank part 14 into the accumulation vessel 18 is brought about in a manner known per se by an ejector 54 which is integrated, in the bottom region of the tank part 14, into the feed line 50.

On the distributor side the feed lines 50 and 52 are connected to a branch piece 56 to which fuel not consumed by an internal combustion engine is fed via a return line 58.

The feed line 52 is connected to an ejector 60 which is provided in the bottom region of the tank part 12 and is preferably held on the accumulation vessel 18, which ejector, for its part, is connected to the connection 24 of the accumulation vessel 18 via a connecting line 62 and serves for continuously conveying fuel out of the tank part 12 into the accumulation vessel 18.

With the aid of the ejectors 54 and 60 substantial emptying of the two tank parts 12, 14 is thus ensured.

The distributor 44 of the tank part 14 and level sensor 40 of the tank part 12 are each preferably further combined with a defuelling line 64 and 66 respectively, which opens out in the bottom region and to which an extraction device can be connected, if required on the outside of the tank, for emptying the tank.

The two feed lines 50 and 52 are flexible, are preferably composed of a suitable plastic and are preferably connected to each other in sections along a surface line. By this means, both feed lines 50, 52 can be introduced into the fuel tank 10, in one working step, through one of the tank openings which are allocated to the accumulation vessel 18 or to the distributor 44, and can be secured, for example, in the interior of the tank in holding clamps.

The flexible feed lines 50, 52 are designed with an excess length such that, for the purpose of their connection, they can be pulled by their end pieces out of in each case one of the tank openings and, outside the fuel tank 10, can be connected to the accumulation vessel 18 and the distributor 44 respectively. The latter are then to be inserted into the corresponding tank openings where, after they have been fastened, they tightly close these openings.

The necessary excess length of the feed lines 50, 52 can be made available, for example, by bending them in an arcuate manner (FIG. 1) and/or by at least one coiled line section, as indicated at 68.

The feed lines 50, 52 and the connecting line 62 can be connected preferably by means of plug-in couplings.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Fuel tank assembly comprising:

a tank including first and second tank spaces spaced from one another and connected at upper parts thereof by a connecting duct, an accumulation vessel operatively arranged at said first tank space and serving to store fuel at a tank side extraction point of a fuel extraction system, a distributor operatively arranged in the second tank space, and two feed lines extending in the interior of the tank between and operatively connected to the distributor and the accumulation vessel, said feed lines being connected to an ejector in a bottom region of a respective tank space, wherein the tank has openings for accommodating each of the distributor and accumulation vessel to tightly close the openings, and wherein the feed lines are flexibly formed and provided with an excess length so they can be pulled by line end pieces out of the openings for connection to at least one of the accumulation vessel and distributor prior to insertion of the accumulation vessel and distributor at the tank.

2. Fuel tank assembly according to claim 1, wherein each of the line end pieces of the feed lines bears one half of a plug-in coupling, the other half of which is provided on respective ones of the accumulation vessel, the distributor and the ejector joined to the accumulation vessel or distributor.

3. Fuel tank assembly according to claim 1, wherein the fuel tank is blow-moulded in one part from plastic and at least the accumulation vessel is connected via a flange-like edge surface to an edge region of a wall opening receiving the accumulation vessel.

4. Fuel tank assembly according to claim 1, wherein the feed lines are composed of plastic and are connected to each other in sections along a surface line of the tank.

5. Fuel tank assembly according to claim 1, wherein the feed lines are bent in an arcuate manner.

6. Fuel tank assembly according to claim 1, wherein the accumulation vessel has a level sensor, which is combined therewith to form a structural unit.

7. Fuel tank assembly according to claim 1, wherein the distributor has a level sensor combined therewith to form a structural unit.

8. Fuel tank assembly according to claim 6, wherein the distributor has a level sensor combined therewith to form a structural unit.

9. Fuel tank assembly according to claim 2, wherein the fuel tank is blow-moulded in one part from plastic and at least the accumulation vessel is connected via a flange-like edge surface to an edge region of a wall opening receiving the accumulation vessel.

10. Fuel tank assembly according to claim 9, wherein the feed lines are composed of plastic and are connected to each other in sections along a surface line of the tank.

11. Fuel tank assembly according to claim 10, wherein the feed lines are bent in an arcuate manner.

12. Fuel tank assembly according to claim 10, wherein the accumulation vessel has a level sensor, which is combined therewith to form a structural unit.

13. Fuel tank assembly according to claim 1, wherein the feed lines are coiled along at least one longitudinal section thereof.

14. Fuel tank assembly according to claim 1, comprising a fuel return line connected to the distributor.

15. A method of manufacturing a fuel tank assembly of the type comprising:

a tank including first and second tank spaces spaced from one another and connected at upper parts thereof by a connecting duct, an accumulation vessel at said first tank space and serving to store fuel at a tank side extraction point of a fuel extraction system, a distributor disposed in the second tank space, and two feed lines extending in the interior of the tank between and connected to the distributor and the accumulation vessel, respective ones of said feed lines being connected to an ejector in a bottom region of a respective tank space, said method including the sequential steps of:

providing openings in the tank for accommodating insertion of the distributor and accumulation vessel;

providing flexible feed lines with a length greater than the shortest distance between the distributor and the accumulation vessel;

connecting the flexible feed lines to the distributor and accumulation vessel by extending the feed lines through the tank and outside the openings where they are connected to the distributor and accumulation vessel; and inserting and attaching the distributor and accumulation vessel to the tank with tight closing of the respective openings.

16. A method according to claim 15, wherein each of the line end pieces of the feed lines bears one half of a plug-in coupling, the other half of which is provided on respective ones of the accumulation vessel, the distributor and the ejector joined to the accumulation vessel or distributor.

17. A method according to claim 15, wherein the fuel tank is blow-moulded in one part from plastic and at least the accumulation vessel is connected via a flange-like edge surface to an edge region of a wall opening receiving the accumulation vessel.

* * * * *